Patented July 6, 1937

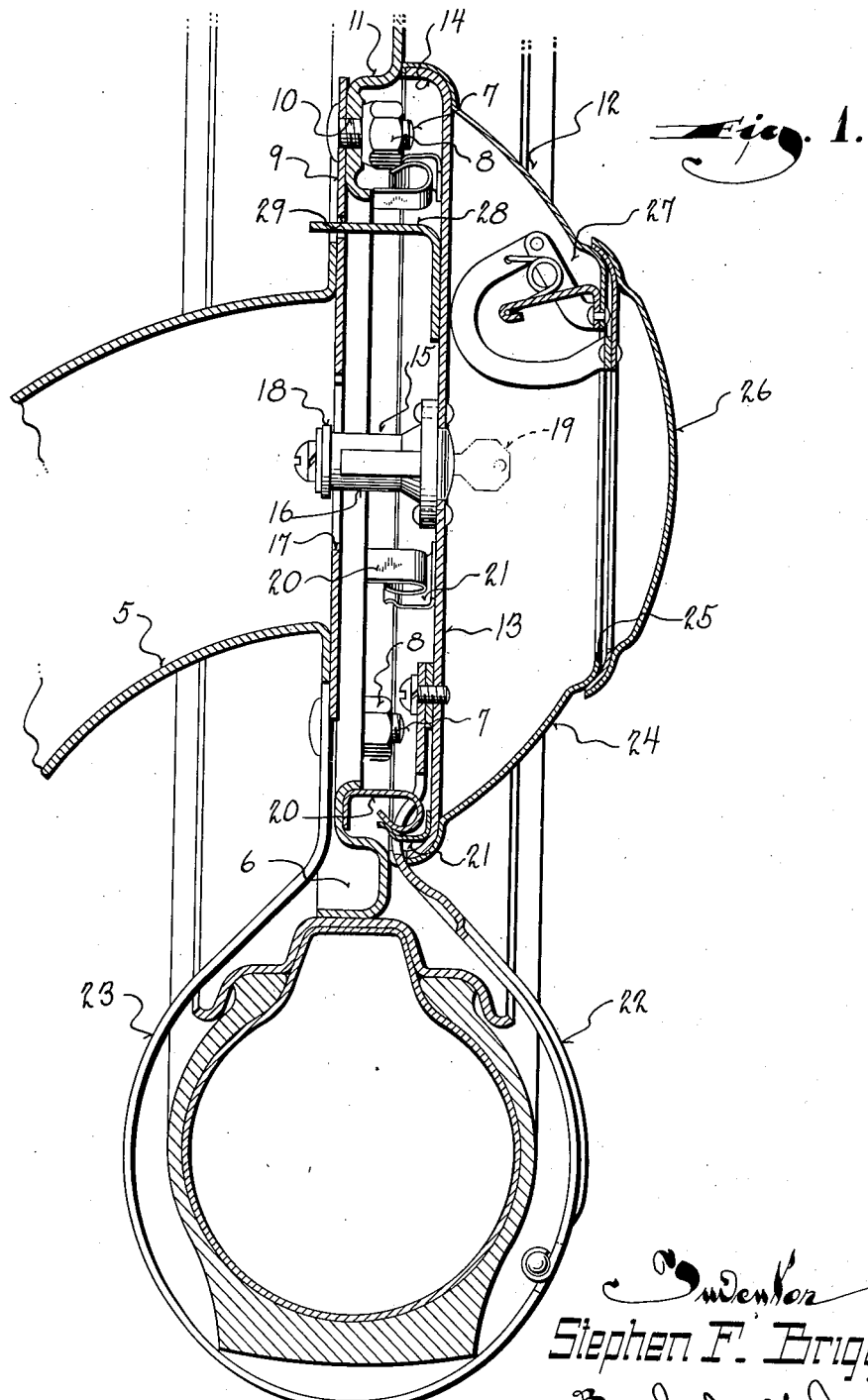

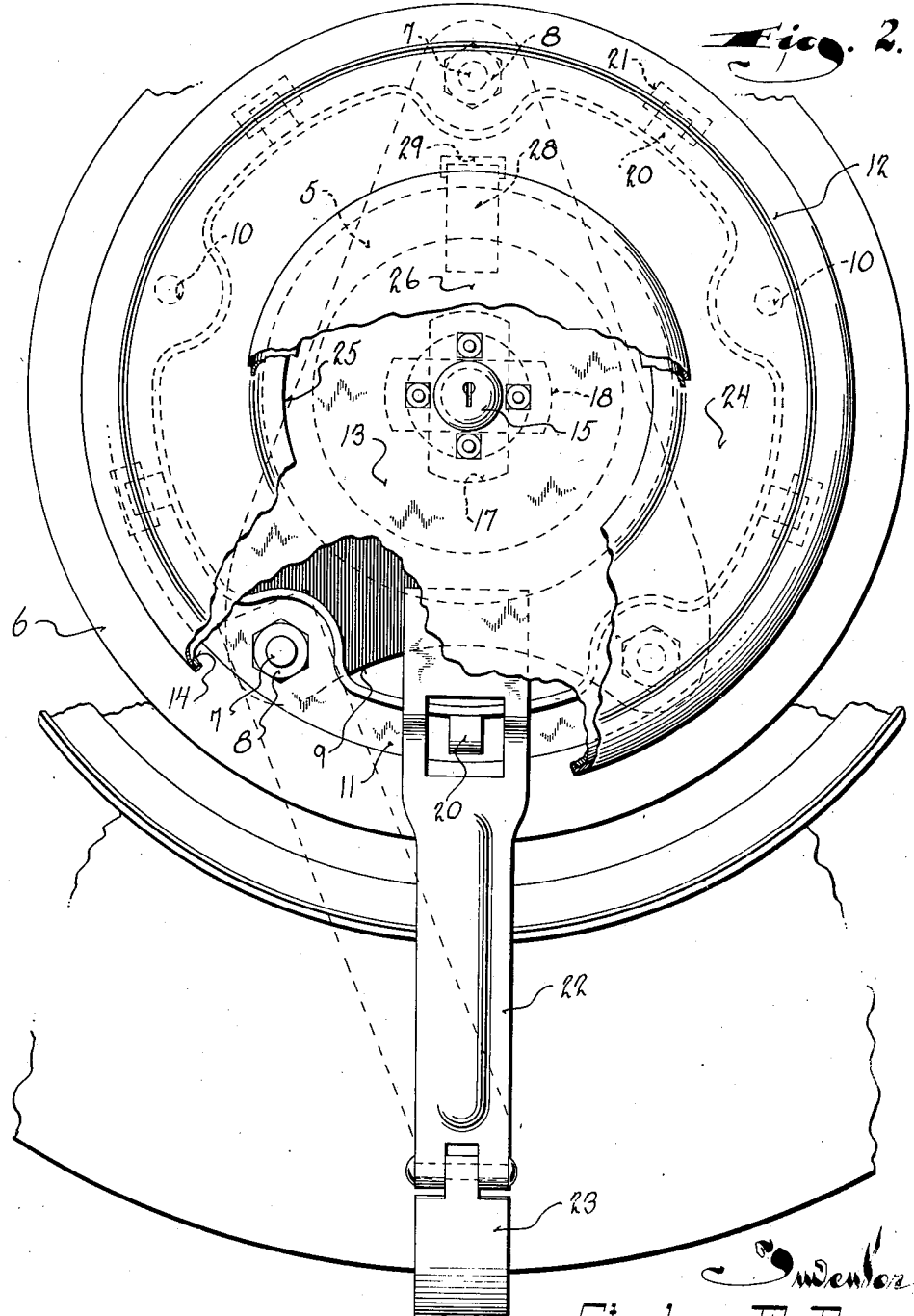

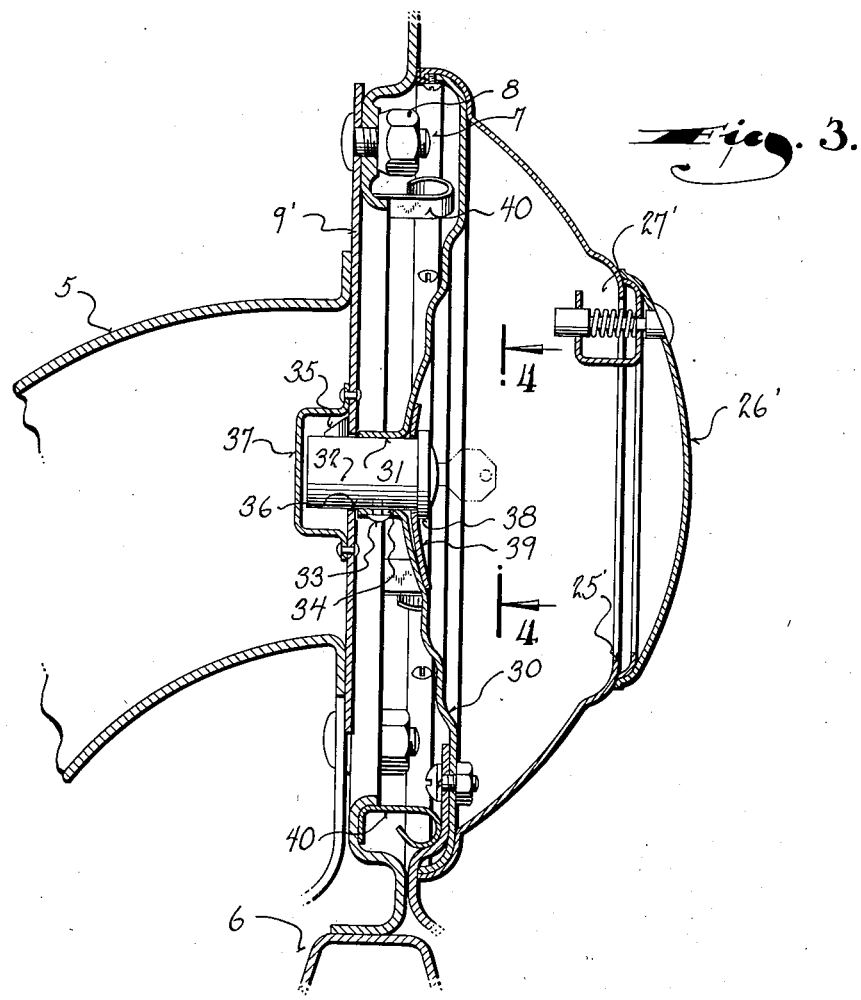
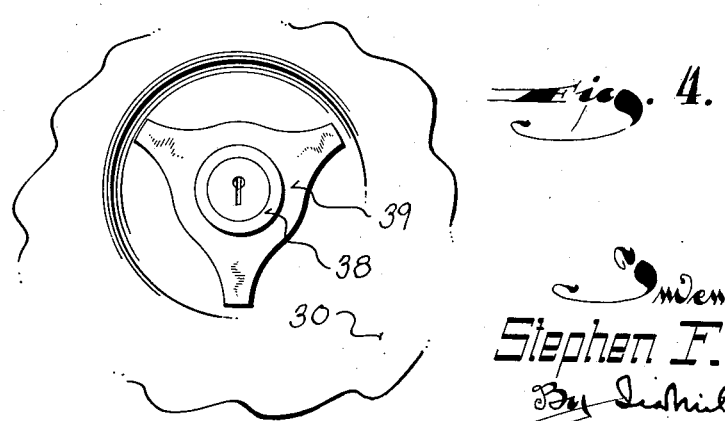

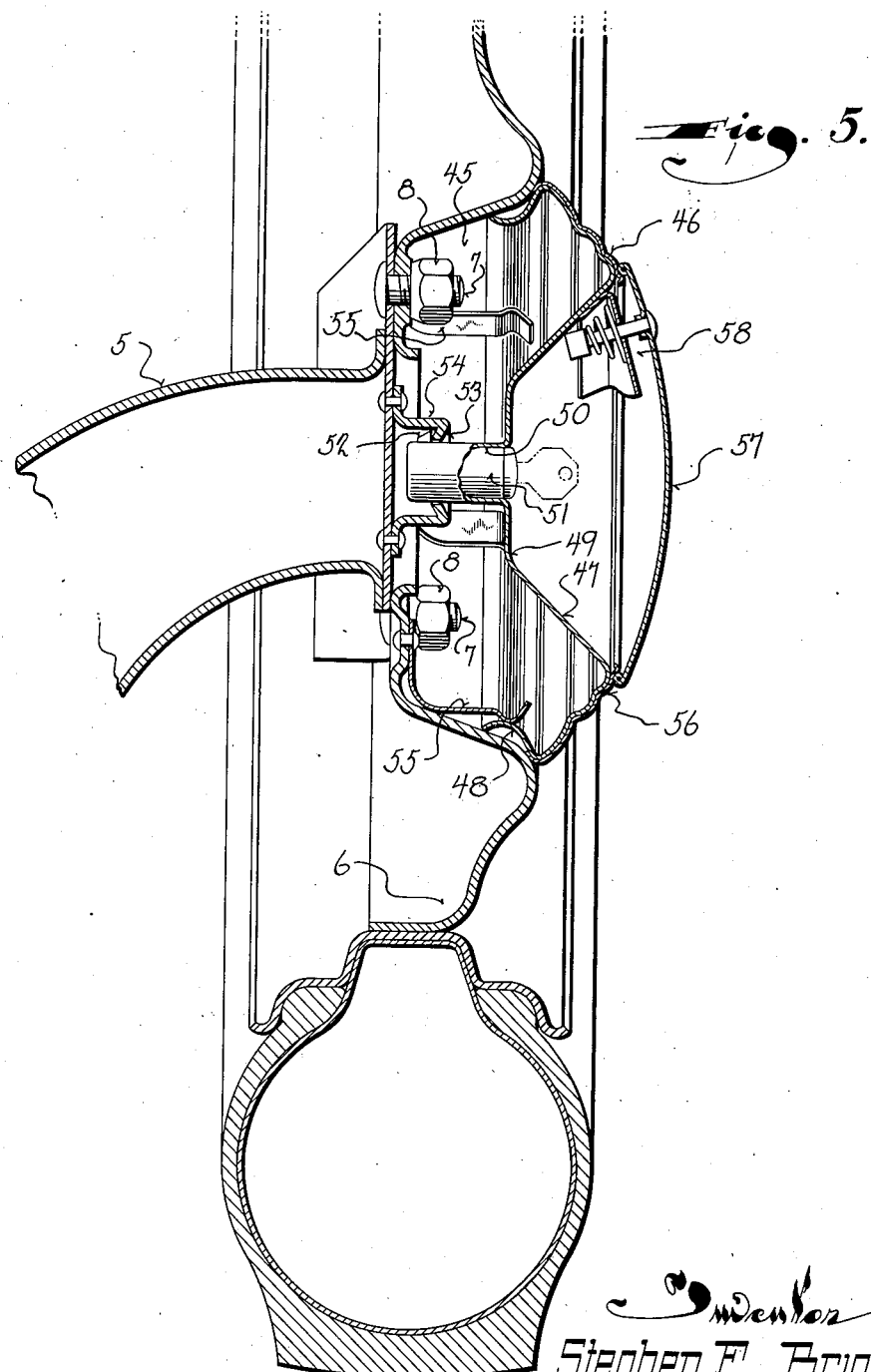

2,085,725

UNITED STATES PATENT OFFICE 2,085,725

SPARE WHEEL LOCK

Stephen F. Briggs, Detroit, Mich., assignor to Briggs & Stratton Corporation, Milwaukee, Wis., a corporation of Delaware Application August 9, 1935, Serial No. 35,505

21 Claims. (Cl. 70—259)

This invention relates to spare wheel locks for automobiles.

It is now the custom to bolt the spare wheels of automobiles onto fixed brackets by bolts passed through the same holes in the hub portions of the wheels used to secure the wheel to the axle. In the past, several different methods of preventing theft of the wheel have been used. In some instances, nut locks have been applied to at least one of the nuts used to secure the wheel to the mounting bracket, and in other cases, covers or caps have been provided for the hub portions of the wheels which covers were locked in place to prevent access to the securing nuts. An example of this latter method of preventing theft of the wheel is found in Patent No. 1,944,945, issued to C. H. Nehls, January 30, 1934.

It is to this latter type of wheel lock that this invention refers particularly, and it is an object of the invention to simplify and improve the construction of such wheel locks in general and to provide improved means for locking the same in place.

Another object of this invention is to provide a hub cover or cap of the character described which is locked in place by means of a spring bolt lock so as to obviate the necessity for rotational motion in the application of the cover.

Another object of this invention is to provide a hub cover of the character described which is locked in place by locking mechanism engaging the carrier bracket as distinguished from past constructions in which the locking mechanism is engageable with some portion of the wheel.

Another object of this invention resides in the provision of simple means for preventing rattling of the parts.

A still further object of this invention is to provide a hub cover of such construction that it cannot be pried off to thus further insure against unauthorized detachment of the wheel.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate several complete examples of the physical embodiment of the invention constructed according to the best modes so far devised for the practical application of the principles thereof, and in which:

Figure 1 is a cross section view through a portion of a spare wheel and its mounting bracket illustrating the application of this invention thereto;

Figure 2 is a plan view of a portion of the wheel and hub cover with parts of the hub cover broken away;

Figure 3 is a cross section view similar to Figure 1, but showing a modified embodiment of the invention;

Figure 4 is a detail view taken on the plane of the line 4—4 in Figure 3;

Figure 5 is a transverse section view similar to Figure 1 but showing another modified embodiment of the invention;

Figure 6:
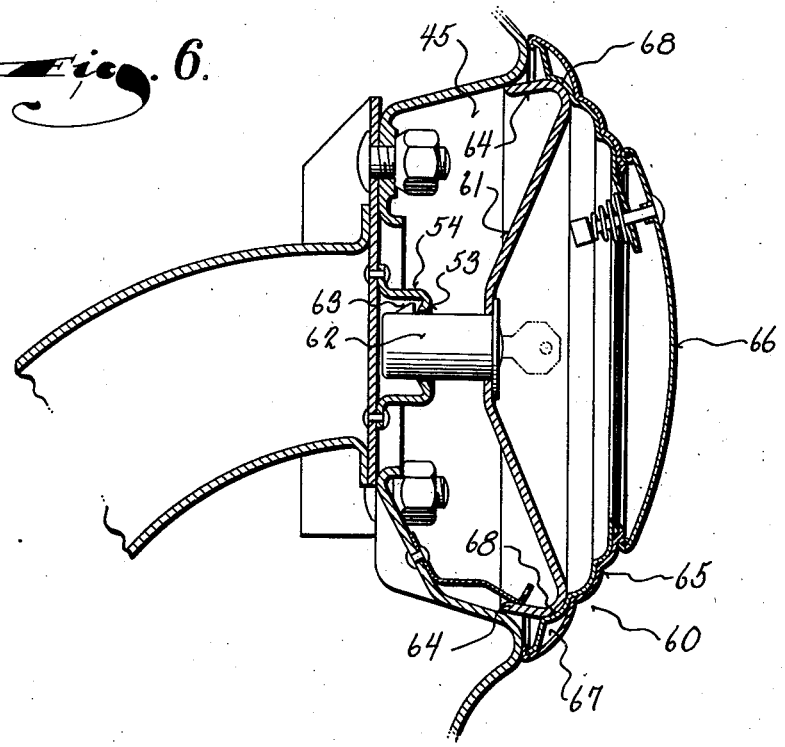
Figure 6 is a transverse section view similar to Figure 1 showing another modified embodiment of the invention.

Referring now more particularly to the accompanying drawings in which like numerals indicate like parts throughout the several views, the numeral 5 represents part of the mounting bracket or carrier to which the spare wheel, indicated generally by the numeral 6, is secured by bolts 7 having removable nuts 8. The bolts 7 are fixed to a plate 9 forming an integral part of the bracket or carrier, and projecting outwardly therefrom to be passed through certain of the holes 10 in the hub portion 11 of the wheel, which holes are also used in the attachment of the wheel to the axle. The nuts 8 tighten down onto the hub portion 11 of the wheel and securely clamp the same to the plate 9 of the carrier bracket.

To prevent theft of the spare wheel, a hub cover or cap, indicated generally by the numeral 12, is locked in place over the securing means to prevent access thereto. This hub cover comprises a stiff metal disc 13 with its periphery flanged inwardly as at 14 and of a diameter to encompass all of the fastening bolts 7 and entirely cover the same when the cover is in place. At its center, the disc 13 has a cylinder lock 15 fixed thereto. This lock is of the conventional type and has a key controlled cylinder rotatable within a casing 16.

The casing 16 is securely riveted or otherwise fastened to the disc 13, as shown, and extends axially inwardly to project through a hole 17 in the carrier bracket plate 9. On the extreme inner end of the lock cylinder (not shown) a latch 18 is secured so as to be rotatable with the cylinder when the same is turned by means of its key 19. The relative dimensions of the parts are such that the latch 18, when the hub cover 12 is in its proper position, lies just inside the plane of the plate 9.

The latch 18, as best shown in Figure 2, is substantially in the form of a rectangular cross bar and the hole 17 is of corresponding shape. Consequently, with the latch 18 in one position of rotation, it may be passed through the opening 17 and thereafter turned ninety degrees to a locked position preventing displacement or removal of the hub cover.

The hub cover is centered with respect to the wheel and held against rattling by spring fingers 20 fixed to the hub portion of the wheel and engaging spring fingers 21 secured to the inner face of the disc 13. The relationship of these spring fingers, as clearly shown in Figure 1, is such that the hub cover may be snapped into position by an inward axial motion.

Proper rotational position of the hub cover is insured by having the same fixed to the hinged section 22 of a strap or band 23 which encircles the tire of the spare wheel to prevent theft of the tire per se, the fixed section of the band 23 being secured to the mounting bracket.

In the event no tire band is provided, proper rotational disposition of the hub cover is assured by means of a tongue 28 fixed to the inner surface of the disc 13 and inserted into an opening 29 in the plate 9.

A neat finished appearance is provided for the hub cover by means of an outer dished shell 24 which is fixed to the flange 14 of the disc 13. Access is had to the lock through a hole 25 in the central portion of the dished shell 24, which hole is normally closed by a cap 26 held in place by a spring hinge contrivance 27.

A modified embodiment of the invention is illustrated in Figures 3 and 4. In this construction, the stiff main disc 30 of the hub cover is formed inwardly to locate its central portion closer to the plate 9' of the carrier bracket. This central portion of the main disc 30 is formed to provide a cylindrical bearing 31 in which the casing 32 of the cylinder lock is slidably disposed. A rivet or lug 33 fixed to the casing of the lock and slidable in a slot 34 in the cylindrical bearing 31 holds the lock against rotation.

The lock has the customary key controlled lock cylinder rotatable within its casing 32 and has a spring bolt 35 projecting radially from the inner end portion thereof to engage over the edge of a hole 36 in the plate 9'. A hood 37 is preferably secured to the inner face of the plate 9' to provide a pocket into which the inner end of the lock projects.

At the outer end of the lock casing 32 is a flange 38 which engages over the edge of a central hole in a spring member 39 so as to confine the spring member between the outer face of the main disc 30 and the flange 38 on the lock casing. The spring member 39 is of triangular formation, as shown in Figure 4, and is made of spring stock so as to yieldingly draw the lock mechanism outwardly in its cylindrical bearing 31.

When the spring bolt 35 is in its operative position, as shown in Figure 3, the tension of the spring member 39 is carried by the engagement of the bolt 35 with the plate 9, and when the hub cover is removed, the outward projection of the lock cylinder 32 by the spring member 39 is limited by the engagement of the rivet 33 with the end of the slot 34. With this construction, it is only necessary to properly locate the hub cover and push the lock in until its spring bolt 35 snaps into operative position. Thereafter, the tension of the spring 39 holds the parts against rattling.

Spring clips 40 fixed to the hub portion of the wheel engage the undersurface of the hub cover and cooperate with the spring member 39 in preventing rattling.

In this embodiment of the invention, the hole 25 in the dished finishing member 24 is closed by a cap 26' pivotally attached and provided with a spring mechanism 27' to hold the same in its normal closed position.

The embodiments of the invention described thus far are for one type of wheel, and in Figure 5, an embodiment of the invention for application to another type of wheel is illustrated.

In this modification, the wheel is secured to the bracket in the same manner, but the wheel is so constructed as to provide a deep central cavity 45 in which the nuts 8 of the wheel securing means are located. The hub cover 46 in its general aspects is similar to the cover shown in the other modifications. There is, however, no flat disc as particularly provided in the embodiment illustrated in Figures 1 and 2. Instead, the main part 47 of the hub cover has a part thereof of generally dished contour and its peripheral portion 48 flanged inwardly to telescope into the cavity 45 formed in the hub portion of the wheel.

To avoid the necessity for a long extension on the lock, the main body part 47 of the cover has its central portion depressed inwardly as at 49 and has a cylindrical bearing 50 formed therein. The lock 51 is mounted in this cylindrical bearing and has a spring bolt 52 arranged to engage in back of a ledge provided by an inwardly directed flange 53 on a cup member 54 fixed to the carrier bracket. The flange 53 is preferably inclined backwardly, as shown, so as to facilitate engagement of the spring bolt thereover as the hub cover is pressed axially into position. Rattling is prevented by spring fingers 55 carried by the wheel and engaging the inside of the peripheral flange 48 on the cover. When the wheel is in use, these spring fingers engage like portions on the regular hub caps.

A neat external appearance is provided by a finishing sheath 56 secured over the outer dished portion of the cover, and the cavity formed by its inwardly depressed portion 49 is closed by a pivoted cap 57 mounted by means of a spring pivot 58 to swing to and from an open position affording access to the lock.

Figure 7:
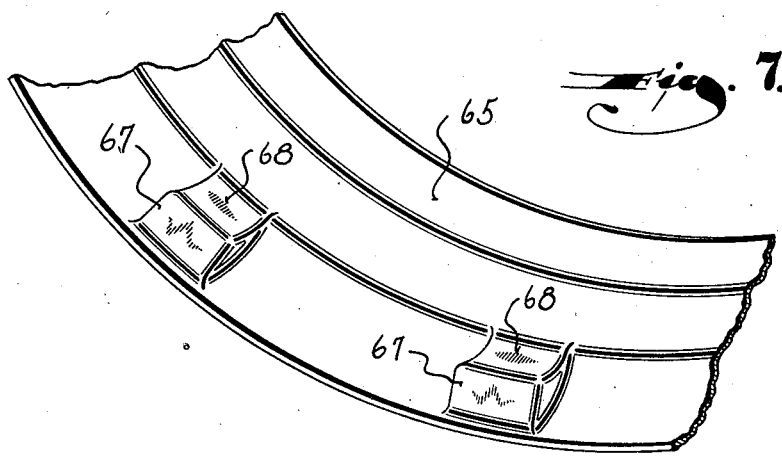
Figure 7 is a fragmentary perspective view illustrating a detail of construction of the embodiment illustrated in Figure 6.

The modification illustrated in Figures 6 and 7 is for the same type of wheel shown in Figure 5. This modification of the invention is characterized particularly by the fact that it cannot be pried out of the hole in the wheel hub.

The manner in which the wheel is secured to the bracket is similar to that shown in Figure 5, and the wheel is provided with the same central recess or depression 45. The hub cover, indicated generally by the numeral 60, comprises a main body plate 61 of comparatively heavy stock dished inwardly and mounting the lock mechanism 62 at its center.

The lock mechanism has a spring bolt 63 which engages in back of a flange 53 on the cup member 54 fixed to the carrier bracket, as in the embodiment shown in Figure 5.

The outer periphery of the main body plate is flanged inwardly as at 64 to telescope into the hole or cavity 45 in the wheel hub, the extreme peripheral edge of the flange 64 being located a substantial distance inwardly from the outer edge of the hole or cavity 45.

Surmounting the body plate 61 is an ornamental cover member or finishing sheath 65 formed of lighter stock and provided with a hinged cap 66 similar to the cap 57 in the embodiment shown in Figure 5. The ornamental cover or sheath has a plurality of spaced instruck portions 67 formed in its outer peripheral portion, as best shown in Figure 7. These instruck portions have surfaces 68 shaped to conform to the outer rounded edge portion of the main body and the sole attachment between the ornamental cover or sheath and the heavy main body is afforded by spot welding these instruck surfaces 68 to the main body.

The ornamental cover or sheath may be either of single or double walled construction, as illustrated. In any event, the outer peripheral edge portion of the sheath extends out beyond the main body 61 to cover the juncture or space between the flange 64 and the wall of the central cavity in the wheel hub.

If a chisel or other tool is driven under the flange of the ornamental cover or sheath in an attempt to pry the entire hub cover off of the wheel so as to expose the fastening means, the spot welded connections between the ornamental cover and the heavy body member will yield and the ornamental cover will be broken off without disturbing the position of the main body plate. The main body plate will remain intact and will present a rounded edge and only a small crevice to the attacking chisel so that it would be extremely difficult to pry the same from its position nested in the depression.

From the foregoing description taken in connection with the accompanying drawings, it will be readily apparent to those skilled in the art to which this invention appertains, that this invention provides a simple and easily applied hub cover which effectively precludes theft of the spare wheel of an automobile by preventing access to the securing means by which the wheel is clamped to the bracket or carrier, and also that by reason of the symmetrical construction of the device with the lock located at the center, a more easily manufactured and less expensive article is obtained.

What I claim as my invention is:

1. In a device for preventing unauthorized removal of a wheel from a wall to which it is secured by detachable fastening means, a ledge continuing from said wall, a cover adapted to cover the fastening means and prevent access thereto, and lock means carried by the cover and engageable behind said ledge for securing said cover in position.

2. In a device for preventing unauthorized detachment of a wheel from a wall to which it is clamped by detachable fastening means engaging the hub portion of the wheel, said wall having a ledge produced thereon by forming a hole in the wall, a hub cover adapted to cover the hub portion of the wheel and to extend over the fastening means to prevent access thereto, and lock means mounted on the central portion of the hub cover and extending into said hole and behind the ledge to secure the hub cover in position.

3. In a device for preventing unauthorized removal of a wheel from a wall to which the wheel is removably clamped by detachable fastening means engaging the hub portion of the wheel, the wall having an apertured part axially located with the edge of the aperture forming a locking ledge, a hub cover to prevent access to said fastening means and thereby guard against theft of the wheel comprising a rigid member of a size to extend over the fastening means, and a key controlled lock mounted on said member with a part thereof projectible into said aperture, the lock including a latch projecting from said part and engageable behind the locking ledge formed by the edge of the aperture to hold the cover in its operative position.

4. Means for locking a wheel on a bracket to which the wheel is removably secured by fastening means engaging the hub portion of the wheel, comprising a part on the bracket extending across the center of the wheel and having an axially located apertured portion, a hub cover for the hub portion of the wheel extending over the fastening means to prevent access thereto, and a key controlled lock carried by the hub cover and having a latch, the latch carrying part of the lock being projectible through said aperture to permit the engagement of the latch over the edge of said aperture to releasably secure the cover in its operative position.

5. Means for mounting and locking an automobile wheel against theft comprising a support having a fixed mounting plate, the mounting plate having a centrally apertured portion, bolts carried by said mounting plate and adapted to be projected through holes in the hub portion of the wheel, clamping nuts threaded on said bolts to clamp the wheel to the mounting plate, a hub cover positionable over the hub portion of the wheel so as to prevent access to said clamping nuts, and a key controlled lock carried by said hub cover and having a latch carrying part projectible into said aperture and a latch engageable behind the ledge formed by the edge of the aperture.

6. Means for mounting and locking an automobile wheel against theft comprising a support having a centrally apertured mounting plate, bolts carried by said mounting plate and arranged in a ring to be projected through the usual holes in the hub portion of the wheel, clamping nuts threaded on said bolts to clamp the wheel to the mounting plate, a hub cover positionable over the hub portion of the wheel and extending over the clamping nuts so as to prevent access thereto, and a lock mounted at the center of the hub cover and including a latch insertable into said aperture in said mounting plate of the support and in back of the edge of the aperture to secure the hub cover in position.

7. In combination with a support adapted to have a wheel mounted thereon, a plate forming part of said support and having a locking ledge adjacent the center of the wheel, bolts carried by said plate receivable in holes in the hub portion of the wheel, nuts threaded on said bolts to clamp the hub portion of the wheel to said plate of the support, a hub cover for the hub portion of the wheel extending out over the clamping nuts to prevent access thereto, said hub cover having a wall adapted to be disposed in spaced parallel relationship to said plate of the support when the hub cover is in place, and a key controlled lock carried by said wall and disposed in the space between said wall and the plate of the support and including a latch engageable behind the ledge of said plate to lock the hub cover against unauthorized removal.

8. In a locking hub cover construction for vehicle wheels, a stiff metal member adapted to cover the hub portion of a vehicle wheel and to prevent access to the fastening means by which the wheel is secured to a support, key controlled lock means carried by said stiff metal member extending along the axis of the cover and projecting beyond the inner plane of the cover for engagement in a hole in part of the support disposed inwardly of the inner plane of the cover for locking the hub cover in position, and an outer finishing shell for the hub cover cooperating with said stiff metal part to provide a hollow space from which the lock is accessible, said shell having a part movable to permit access to said hollow space.

9. In a locking hub cover construction for vehicle wheels, a main body portion of stiff sheet metal, a finishing shell carried by said main body portion including a removable cap, said parts being so formed as to provide a hollow space therebetween, and a key controlled lock carried by the main body portion in a position to extend along the axis of the wheel, said lock being of a length so that its inner end portion which carries a latch projects beyond the inner plane of the cover structure for locking engagement with a stationary abutment near the wheel center but inwardly of the inner plane of the cover, and said lock being accessible for key actuation only from said hollow space.

10. In a locking hub cover construction for vehicle wheels, a double walled unit of a size to cover the hub portion of a wheel and extend over fastening means by which the wheel is attached to a support to prevent access to such fastening means, the inner and outer walls of said double walled unit being spaced apart at the center to provide a cavity, a key controlled lock carried by the inner wall for locking the hub cover in position, said lock projecting beyond the inner plane of the cover so as to be engageable in an aperture in a support carried part which lies inwardly of the inner plane of the cover and being accessible for key actuation from the inside of said hollow cavity, and a removable cap forming part of said outer wall and movable to a position affording access to the interior of said hollow cavity.

11. In a hub cover construction for vehicle wheels, a main body portion of stiff sheet metal of a size sufficient to cover the hub portion of a wheel and to extend over fastening means by which the wheel is attached to a support, a key controlled lock carried by the main body portion and extending along the axis of the cover to lock on an abutment near the center of the wheel whereby the center of the main body portion is braced, and means cooperating with said main body portion to define a hollow chamber from which said key controlled lock is accessible, said means having a part movable to afford access to said hollow chamber.

12. In a locking hub cover construction for vehicle wheels, a main body portion adapted to cover the hub portion of the wheel and extend over fastening means by which the wheel is attached to a support, a key controlled lock carried by said body portion and having a part projecting beyond the inner plane of the cover for locking engagement with a support which lies inwardly of the inner plane of the cover and upon which the wheel is mounted for locking the hub cover in position, and an outwardly dished finishing shell fitted to lie snugly against the periphery of said body portion and to be supported thereby with its middle portion free from the body portion so that the shell completely covers the body portion and cooperates with it in the provision of a hollow chamber from which the key controlled lock is accessible, part of said shell being readily removable to enable access to the interior of said hollow chamber.

13. In a locking hub cover construction for vehicle wheels, a main body portion formed of stiff sheet metal and of a size to extend over fastening means by which the wheel is secured to a support, a key controlled lock carried by said main body portion and having a latch located beyond the inner plane of the cover for locking engagement with the support which lies inwardly of the inner plane of the cover and upon which the wheel is mounted, an outer shell fixed to said main body portion and dished outwardly therefrom to form a hollow chamber from which the lock is accessible, said outer shell having a central hole and a removable cap closing said central hole.

14. In a locking hub cover construction for vehicle wheels, a main body portion formed of stiff sheet metal, a cylindrical bearing carried by said main body portion at the center thereof, a key controlled lock mounted in said bearing and having a part projecting beyond the inner plane of the cover for insertion into a hole in the support on which the wheel is mounted, said part having a latch engageable behind the edge of the hole for locking the hub cover in place, and an outer finishing shell fixed to said main body portion and formed partially by a cap which is movable to enable access to the key controlled lock.

15. In a locking hub cover construction for vehicle wheels, a main body portion formed of stiff sheet metal and of a size to cover the hub portion of the wheel and to extend out over fastening means by which the wheel is secured to a support, a cylindrical bearing carried by said main body portion and disposed centrally thereof, a key controlled lock mounted in said bearing and having a latch engageable with a portion of said support to lock the hub cover against detachment, means to support the central portion of the main body plate against being bent or bowed toward the support, and a finishing shell covering the main body portion to present a neat external appearance for the hub cover, said finishing shell being formed partially by a removable cover which is disposed over the key controlled lock mechanism.

16. In a locking hub cover construction for vehicle wheels, a main body portion formed of stiff sheet metal and of a size to cover the hub portion of the wheel and extend over fastening means by which the wheel is attached to a support, said main body portion having a central inwardly dished portion, a cylindrical bearing located at the bottom of said inwardly dished portion, a key controlled lock mounted in said bearing and having a latch engageable in back of a ledge on said support, an outer shell fixed to the main body portion and providing a finishing sheath therefor, said outer shell having a hole through which access is had to the chamber formed by the inwardly depressed portion, and a removable cap closing said hole.

17. In a locking hub cover construction for vehicle wheels, a main body portion formed of stiff sheet metal and of a size to cover the hub portion of the wheel and extend over fastening means by which the wheel is secured to a support, a bearing carried by the main body portion at its center, a key controlled lock mechanism bodily slidable in said bearing, spring means for yieldingly urging the lock mechanism outwardly of said bearing, means for limiting the spring actuated outward projecting of the lock mechanism, and a latch carried by said lock mechanism and engageable in back of a ledge on said support, engagement of said latch in back of the ledge on the support placing said spring means in tension whereby said spring means acts to take up play between the parts and prevent rattling.

18. In a hub cover of the character described, a main body portion, a bearing carried by said body portion, a lock mechanism slidable in said bearing and including a latch bolt, a shoulder on the outer end of the lock mechanism, a spring confined between said shoulder and the adjacent outer face of the main body portion to yieldingly urge the lock mechanism outwardly of said bearing and to draw the latch bolt into firm engagement with a ledge with which it is engaged, and means for limiting outward projection of the latch bolt by said spring when the latch bolt is disengaged from such ledge.

19. A locking hub cover construction for vehicle wheels having a central depression in the hub portion thereof, comprising a main body portion formed of stiff metal with its outer periphery arranged to telescope into the depression in the wheel hub, lock means carried by the main body portion for locking the hub cover in place, and an outer ornamental finishing shell attached to the main body portion and having a flange extending out beyond the periphery of the main body portion to prevent the insertion of a tool between the edge of the body portion and the adjacent wall of the depression in the wheel hub.

20. In a locking hub cover construction for vehicle wheels having a central depression in the hub portion thereof, a main body portion formed of stiff metal and having the outer edge thereof shaped to nest within the central depression in the wheel hub, lock mechanism carried by the main body portion for securing the hub cover in place, and an outer ornamental covering sheath secured to the main body portion, said covering sheath having a portion extending beyond the body portion to cover the juncture between the body portion and the wall of the depression in the wheel hub to prevent the insertion of a tool between the edge of the main body portion and the wall of the depression, and said ornamental covering sheath being secured to the main body portion by a frangible connection so as to break off from the main body portion upon application of a prying force on the edge of the ornamental covering sheath.

21. Means for locking a wheel to a mounting bracket to which the wheel is removably secured by fastening means adapted to clamp the hub portion of the wheel to the bracket, comprising a part on said bracket extending across the center of the wheel, said part having an axially located apertured portion, a hub cover adapted to cover the hub portion of the wheel and extending out over the fastening means to prevent access thereto, and a key controlled lock carried by said hub cover and having a part projectable into said aperture and having a latch carried by said part and engageable behind the ledge formed by the edge of said aperture for securing the cover in place.

STEPHEN F. BRIGGS.